H. J. TURNER.
COMBINATION SHAKER.
APPLICATION FILED MAR. 2, 1909.
947,315.
Patented Jan. 25, 1910.
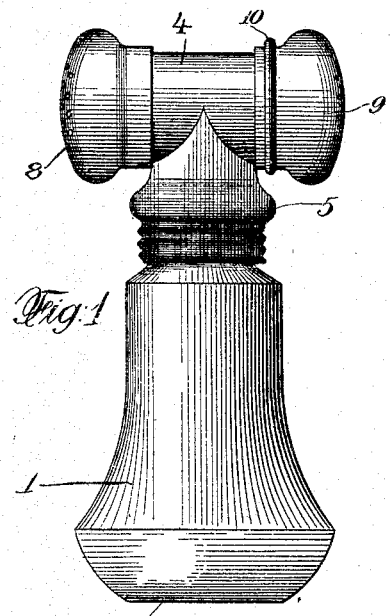
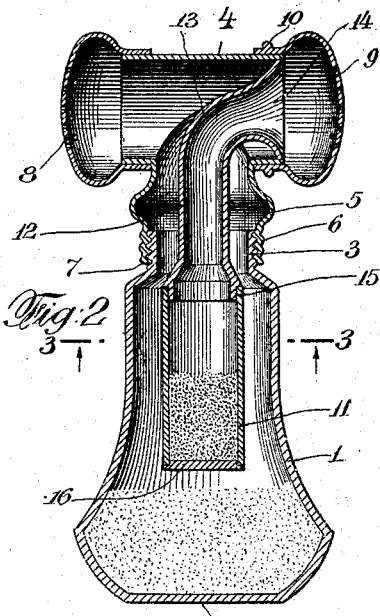
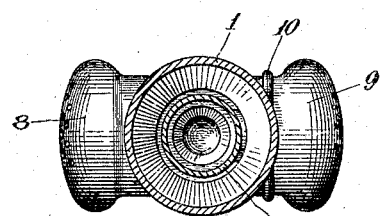
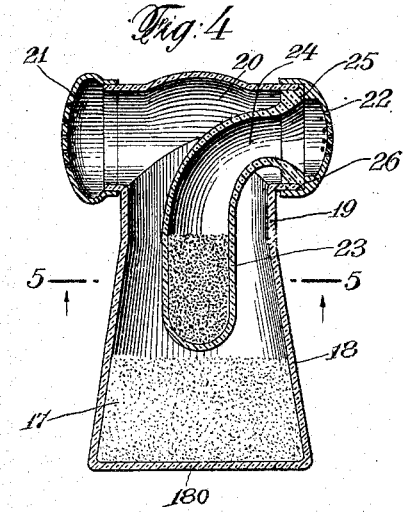
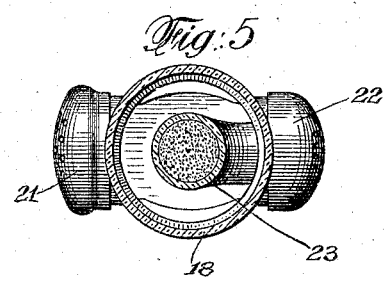
Witnesses:
W. E. Margason
Sarah Flock
Harold J. Turner, Inventor
By his Attorney
W. F. Bissing

UNITED STATES PATENT OFFICE.

HAROLD J. TURNER, OF MONTCLAIR, NEW JERSEY.

COMBINATION-SHAKER.

947,315.  Specification of Letters Patent.  Patented Jan. 25, 1910.

Application filed March 2, 1909. Serial No. 480,979.

*To all whom it may concern:*

Be it known that I, HAROLD J. TURNER, a citizen of the United States, and a resident of Montclair, Essex county, New Jersey, have invented certain new and useful Improvements in Combination-Shakers, of which the following is a specification.

My invention relates to combination condiment receptacles and particularly to that class of receptacles for delivering pepper and salt in which one container, preferably the pepper container, is arranged within the other container, which preferably carries salt.

One of the objects of my invention is to provide a combination condiment receptacle having a hollow base for the salt with a hollow cross-head having a salt cap at one end and communicating with the base, together with a hollow container for the pepper located within the base and communicating with the pepper cap which is arranged at the opposite end of said neck, at the same time producing a device of pleasing shape which can be easily cleaned and manipulated, which is without valves, which can be used to deliver salt or pepper at will, without making a mistake and which tends to keep the salt dry.

With the above and other objects in view, my invention consists in the parts, improvements and combinations more fully pointed out hereinafter.

Referring now to the drawings, which are attached to the specification and form a part thereof:—Figure 1 is an exterior view of one embodiment of my invention. Fig. 2 is a vertical transverse section of the device shown in Fig. 1. Fig. 3 is a horizontal section on the section line indicated in Fig. 2. Fig. 4 is a vertical section of another embodiment of my invention. Fig. 5 is a horizontal section on the section line indicated in Fig. 4.

In accordance with the invention, my combination condiment shaker comprises a suitable hollow base 1, which is preferably bottle shaped and is adapted to contain condiment, particularly salt. The bottom of the base 2 is made flat so that it will stand upright. The base may be made of any desired material. In the form of the invention shown in Fig. 2, the base is made of glass, but it may be made of metal or other suitable material. As illustrated, the base has a wide bottom and substantially straight sides above the bottom. The salt thus easily slides over the sides on its way to the salt cap. The base is provided at the top with a suitable throat 3 and the hollow transverse cross-head 4 communicates with the base by means of the throat. The form of the throat may be widely varied, as may also the means for connecting the throat with the cross-head 4. The throat acts as a gage to determine when the salt compartment has been filled, tends to prevent overcharging and readily clears itself from an overcharge.

As shown in Fig. 2 a screw coupling 5 which is screw-threaded at 6 is connected to screw thread 7 on the outside of the throat 3. The other end of the coupling is preferably integral with the cross-head 4.

Suitable caps are provided, one for one form of condiment and the other for another, through which the condiment is delivered. These caps are perforated and are carried by opposite ends of the cross-head. The cap which connects with the salt receptacle, I have designated the salt cap and indicated by the numeral 8. The cap adapted to deliver the pepper I have called the pepper cap and have indicated by the numeral 9.

One of the caps is provided with a distinguishing characteristic so that the pepper end may be readily distinguished from the salt end and vice versa. In the embodiment shown in Fig. 1, I make use of a distinguishing rib 10 which is located on the pepper cap 9 for this purpose. The rib may be blackened, if desired.

In the best embodiment of my invention, I provide a hollow container 11 within the hollow base 1 which container preferably contains the pepper and which is connected to one end of the cross-head. This container is of smaller size than the base and is arranged within it so as to leave an open space between the container and the sides of the base. A part of the pepper container is located within the throat 3 so as to produce an annular passage way between the salt receptacle and the salt cap. In the best embodiment of the invention, the cross section of the throat is so proportioned, as well as the cross section of the inner pepper container, that the pepper container may be readily inserted through it. The cross section of the inner container is preferably made about one half of the cross section of the throat. The size of the annular passage way is chosen so as to regulate the proper flow of salt when the shaker is held on its side and shaken. The narrow annular passage way affords a small outlet for the salt and tends to protect the salt from atmospheric moisture.

The pepper container 11 preferably has a constricted passage way 12 which connects it with the pepper cap 9. The diameter of the passage way is, at its constricted portion, smaller than that of the pepper container. This tends to prevent the pepper from flying through the passage way and choking the pepper cap. The passage way 12 is provided with an elbow 13 and with a flaring mouth 14 which communicate with the pepper cap. The flaring mouth returns unused pepper to the container when the container resumes its vertical position. The passage way, as will be observed makes a substantially right angled turn which likewise tends to prevent the entire mass of pepper from being precipitated upon the pepper cap every time the device is used. The pepper and salt caps are preferably made removable, as illustrated, for convenience in filling and cleaning the shaker. The pepper receptacle may also be provided with a screw threaded portion 15 which connects with a screw threaded portion on the passage way 12 so as to be readily disconnectible. The pepper container may also be provided with a removable screw-threaded bottom 16 to facilitate cleaning.

In the embodiment of the invention shown in Fig. 4, I make use of a hollow base 17 having the flat bottom 180, which base is adapted to contain the salt. The base has substantially straight sides 18, inclining inwardly to secure an easy delivery of the salt, the base terminating in a throat 19. The throat 19 which preferably has straight sides, acts as a gage to determine when the salt compartment is full, tends to prevent overcharging and readily clears itself from an overcharge. A hollow transverse crosshead 20 is provided which communicates with the base 17 by means of the throat 19. In the embodiment of the invention illustrated in Fig. 4, the hollow cross-head and the base are made of one piece and are preferably cast out of glass. This enables the location of the pepper container within the base to be readily discerned and tends to prevent mistakes. The hollow glass neck is provided at opposite ends with a removable salt cap 21 and a removable pepper cap 22, respectively. In order to distinguish the pepper cap from the salt cap the pepper cap is preferably made of a smaller diameter than the salt cap and shallower. The shallowness of the pepper cap also avoids an accumulation of pepper in the cap.

The hollow pepper container 23 in the form of the invention shown in Fig. 4 is preferably made in a single piece, and in the best embodiment of the invention is made of glass. It is provided with a passage way 24 which preferably has a constricted portion and terminates in a flaring mouth 25 that is closed by the pepper cap 22. The flaring mouth returns the unused pepper to the container. The pepper container 23 is preferably made removable, which may be accomplished by providing a flange 26 on the mouth of the pepper container, the latter being clamped in place by the cap 22. It will be observed that the passageway 24 makes a substantially right angled turn, forming an elbow.

Having thus described my invention, its operation will be readily understood. The parts are removable and the device may be readily filled and cleaned. There is an absence of valves and of parts likely to get out of order, and no chance of mistake in readily determining which is the pepper or salt end of the shaker.

It will be obvious that many changes may be made in the particular form assumed by the device without sacrificing the principle of the invention or its leading advantages.

What I claim and desire to secure by Letters Patent is:—

1. A combination condiment shaker comprising a hollow base, adapted to contain condiment, said base being provided with a throat, a hollow transverse crosshead communicating with said base by means of said throat and having oppositely arranged ends, a perforated cap carried by one end of said crosshead and adapted to deliver said condiment, a perforated cap carried by the other end of said crosshead and a hollow container arranged within said throat and communicating with said latter cap so as to deliver another condiment.

2. A combination shaker for pepper and salt comprising a hollow bottle shaped base adapted to contain salt, said base being provided with a throat, a hollow transverse crosshead communicating with said base by means of said throat and having oppositely arranged ends, a perforated salt cap carried by one end of said neck and adapted to deliver said salt, a perforated pepper cap carried by the other end of said neck and a hollow container adapted to contain pepper and located within said base, a portion of said container being arranged within said throat so as to provide an annular passageway for the salt, said container having a constricted passageway communicating with said pepper cap.

3. A combination shaker for pepper and salt comprising a hollow bottle shaped base adapted to contain salt, said base being provided with a throat, a hollow transverse straight crosshead communicating with said base by means of said throat and having oppositely arranged ends, a perforated salt cap carried by one end of said neck, a perforated pepper cap carried by the pepper end of said neck, one of said caps having a distinguishing characteristic, and a hollow pepper container carried by said pepper end of said neck and located within said base, a portion of the container being arranged within the throat of the base so as to provide an annular passageway for the salt, said container having a passageway forming an elbow and communicating with said pepper cap.

4. A combination shaker for pepper and salt comprising a bottle shaped base adapted to contain salt, said base having a flat bottom portion, and provided with a throat, a hollow, a transverse glass crosshead integral with said base and communicating therewith by means of said throat and having oppositely arranged ends, a removable perforated salt cap carried by one end of said neck, a removable perforated pepper cap carried by the other end of said neck, a hollow pepper container carried by the pepper end of said neck and located partly within the throat portion of said base so as to provide a passageway for the salt, the bottom of said pepper container being above the bottom of the salt container, said pepper container having a passageway forming an elbow and provided with a constricted portion, which passageway communicates with and is closed by said pepper cap.

5. A combination shaker for pepper and salt comprising a bottle shaped base adapted to contain salt, said base having a flat bottom portion, and provided with a throat, a hollow, transverse glass crosshead integral with said base and communicating therewith by means of said throat and having oppositely arranged ends, a removable perforated salt cap carried by one end of said neck, a removable perforated pepper cap carried by the other end of said neck, said cap being shallower and of smaller diameter than said salt cap, a hollow removable pepper container carried by the pepper end of said neck and located partly within the throat portion of said base so as to provide a passageway for the salt, the bottom of said pepper container being above the bottom of the salt container, said pepper container having a passageway forming an elbow, provided with a constricted portion and a flaring mouth, which passageway communicates with and is closed by said pepper cap.

6. A condiment shaker comprising a hollow base adapted to contain condiment, a hollow crosshead connected with the top of said base and carrying at each end a perforated cap, a hollow container of smaller size than said base and arranged therewithin so as to leave an open space between said container and said base, said container being connected to one end of said crosshead so as to deliver condiment through one of said caps.

7. A condiment shaker comprising a hollow base adapted to contain condiment, a hollow cross-head integral with said base and carrying at each end a perforated cap, a hollow container of smaller size than said base and arranged therewithin so as to leave an open space between said container and said base, said container being connected to one end of said cross-head so as to deliver condiment through one of said caps.

8. A condiment shaker comprising a hollow glass base adapted to contain condiment, a hollow glass cross-head integral with said base and connected with the top thereof, said cross-head carrying at each end a perforated cap, a hollow container of smaller size than said base and arranged therewithin so as to leave an open space between said container and said base, said container being connected to one end of said cross-head by an elbow like passage, so as to deliver condiment through one of said caps.

9. A combination shaker comprising a hollow base, a hollow crosshead mounted on the top of said base and communicating therewith and carrying at each end a perforated cap, a hollow container of smaller size than said base and arranged therewithin so as to leave an open space between said container and said base, said container being connected to one end of said crosshead by means of a passageway, so as to deliver the material through one of said caps.

10. A condiment shaker comprising a hollow receptacle adapted to contain condiment, a hollow crosshead connected with the top of said receptacle and carrying at each end a perforated cap, a hollow container having a portion arranged within said receptacle so as to leave an open space between a portion of the receptacle and the container, said container being connected at one end of the crosshead so as to deliver condiment through one of said caps.

In testimony whereof, I have signed my name to this specification, in the presence of two subscribing witnesses.

HAROLD J. TURNER.

Witnesses:
  W. F. BISSING,
  W. C. MARGESON.